Dec. 9, 1930.  M. HOLUM  1,784,690
SEED CORN STRINGER
Filed Aug. 5, 1929   2 Sheets-Sheet 1
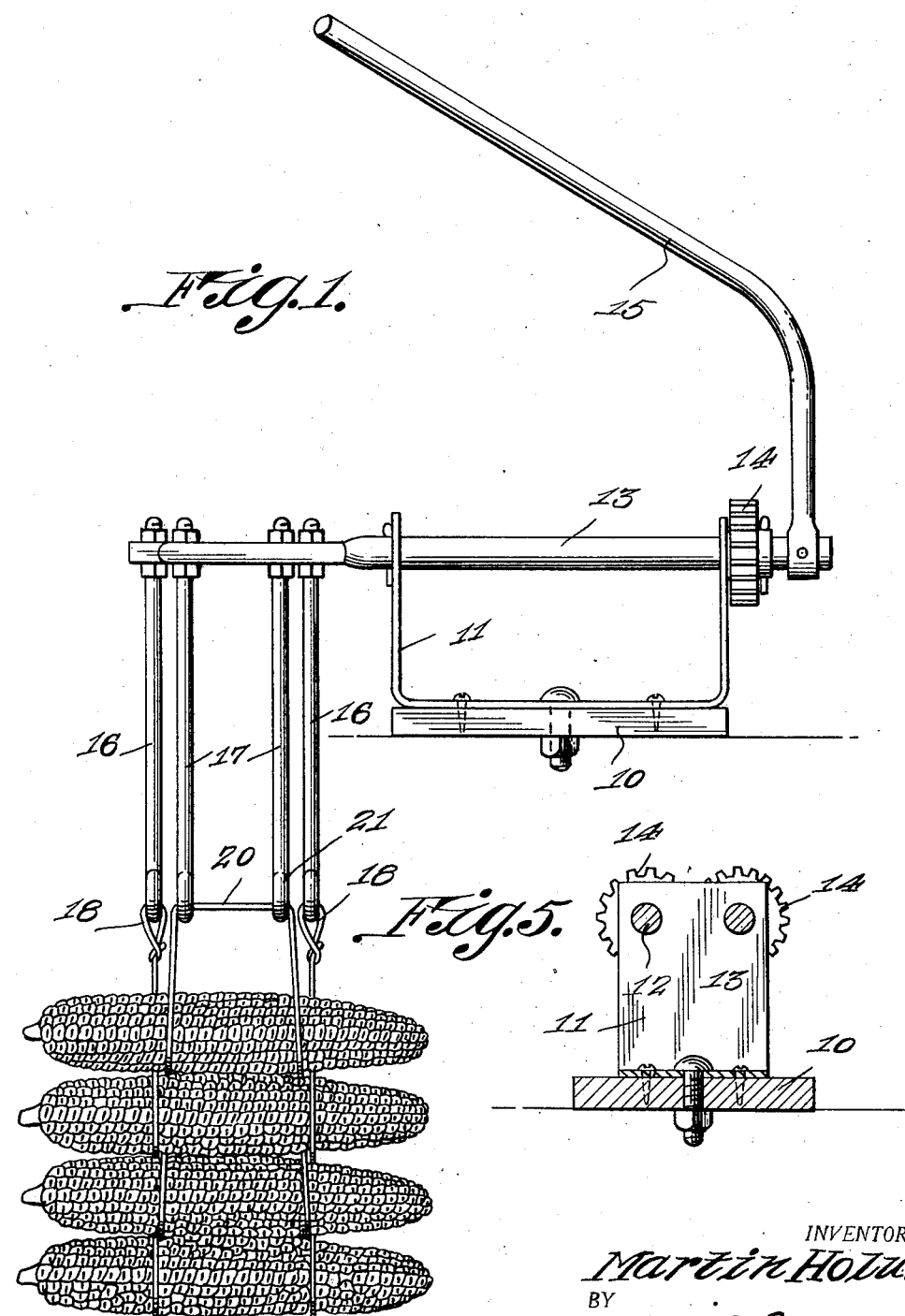
INVENTOR.
Martin Holum,
BY
Victor J. Evans
ATTORNEY.

Dec. 9, 1930. M. HOLUM 1,784,690
SEED CORN STRINGER
Filed Aug. 5, 1929 2 Sheets-Sheet 2
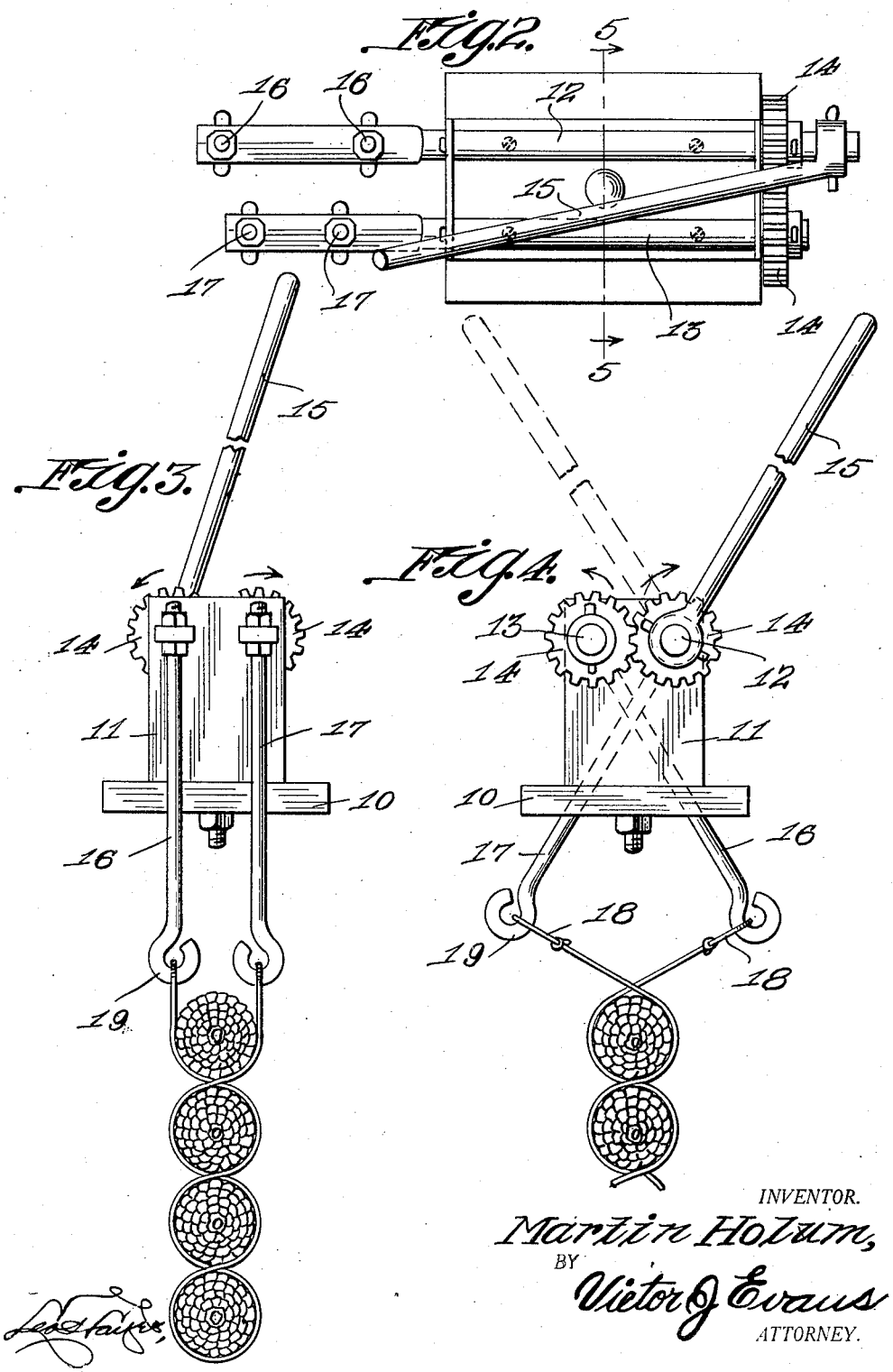

Patented Dec. 9, 1930

1,784,690

UNITED STATES PATENT OFFICE

MARTIN HOLUM, OF HAZEL RUN, MINNESOTA

SEED-CORN STRINGER

Application filed August 5, 1929. Serial No. 383,770.

This invention comprehends the provision of a device for stringing seed-corn in a manner whereby the latter can be conveniently suspended from an overhead support for drying and curing, and otherwise conveniently handled for moving the same from place to place.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a side elevation of the device illustrating the manner in which the corn is strung for the purpose above mentioned.

Figure 2 is a top plan view.

Figure 3 is an end elevation.

Figure 4 is a view looking from the other end of the device and showing how the fingers are actuated to cross the strands of twine.

Figure 5 is a sectional view on line 5—5 of Figure 2.

The device forming the subject matter of the present invention embodies a bracket adapted to be mounted on a suitable support 10. While the bracket may vary in size and contour, it is preferably U-shaped and indicated at 11. The spaced parallel portions of this bracket constitute bearings for a pair of spaced parallel shafts 12 and 13 respectively. The shafts project beyond the adjacent portions of the bracket, corresponding ends of the shafts being equipped with gears 14 meshing with each other as illustrated.

The shaft 12 is provided with an operating lever 15, and it is manifest that as this shaft is rocked or rotated in opposite directions, similar motion is imparted to the shaft 13 through the instrumentality of the gears 14. The opposite and corresponding ends of the shafts are substantially flat, while depending from each shaft is a pair of fingers terminating at their lower ends to form hooks. The fingers on the shaft 12 are indicated at 16 while the fingers on the shaft 13 are indicated at 17. The fingers on each shaft are arranged one behind the other, while the fingers 16 on the shaft 12 are spaced apart a slightly greater distance than the fingers carried by the shaft 13. In conjunction with a device of this character I employ a single length of twine, the ends of which are formed to provide loops 18, the twine being folded upon itself with said loops receiving the hooks 19 of the fingers 16. The closed or intermediate end 20 of the twine is then arranged in the hooks 21 of the fingers 17 as clearly illustrated in Figure 1, thereby providing the twine with spaced pairs of strands In practice, after the twine has been suspended from the fingers 16 and 17 in the manner illustrated and described, the first ear of corn is laid within the strands of the twine, after which the lever 15 is operated to rotate the shafts 12 and 13 toward each other. This operation causes the fingers 16 on the shaft 12 to cross the fingers 17 on the shaft 13, and at the same time cause the spaced strands to cross each other as illustrated in Figure 4. After the next ear is placed between the strands, the lever 15 is again operated to cause the fingers to cross each other, and this operation is continued until the string of corn is completed, whereupon the loops 18 and the intermediate portion 20 of the twine are removed from the fingers, so that the string of corn can be suspended from an overhead support in any suitable manner.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

In a device of the class described, a bracket, a pair of spaced parallel shafts journaled thereon for partial rotation in opposite directions, flattened portion formed on corresponding extremities of each shaft and projecting an appreciable distance beyond said brackets a pair of hook-like fingers depending from the flattened portion of each shaft, with the fingers of each pair of equal length and arranged one in advance of the other, and the fingers of one shaft spaced apart a greater distance than the fingers of the other shaft, said fingers being adapted to suspend a piece of twine therefrom in the form of looped strands, and means for imparting rotation to said shafts to cause said fingers to alternately cross each other and assume parallel positions, and instantly cross said strands for the purpose specified.

In testimony whereof I affix my signature.

MARTIN HOLUM.